(12) United States Patent
Desruisseaux et al.

(10) Patent No.: US 6,324,588 B1
(45) Date of Patent: Nov. 27, 2001

(54) USER INTERFACE CONTROL SOFTWARE FOR A COMMUNICATION DEVICE

(75) Inventors: Marc S. Desruisseaux, Coral Springs, FL (US); David G. Wiatrowski, Gurnee; Mark C. Gonsalves, Elgin, both of IL (US); Srikumar Nayar, Boca Raton, FL (US); Helen Koenigsman, Plantation, FL (US); Yu-Ling F. Chang, Plantation, FL (US); David J. Ley, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/829,881

(22) Filed: Apr. 2, 1997

(51) Int. Cl.[7] .................................................. G06F 9/00
(52) U.S. Cl. ............................................................ 709/313
(58) Field of Search .................................. 709/300, 310, 709/313, 315, 328; 345/326; 455/418, 419, 550, 556

(56) References Cited

U.S. PATENT DOCUMENTS

| | | | |
|---|---|---|---|
| 5,363,315 | 11/1994 | Weiss et al. | 364/514 |
| 5,381,346 | 1/1995 | Monahan-Mitchell et al. | 364/514 |
| 5,490,275 | 2/1996 | Sandvos et al. | 395/700 |
| 5,581,687 | * 12/1996 | Lyle et al. | 395/326 |
| 5,926,756 | * 7/1999 | Piosenka et al. | 455/418 |
| 5,929,855 | * 7/1999 | Benton et al. | 345/349 |
| 5,978,674 | * 11/1999 | Jackson et al. | 455/419 |

OTHER PUBLICATIONS

Eller, Richard R. N. "How to Manage Large APL Projects: A User Interface Management System Approach" pp. 150–160, Apr. 1991.*

* cited by examiner

Primary Examiner—Majid A. Banankhah
Assistant Examiner—Lewis A. Bullock, Jr.
(74) Attorney, Agent, or Firm—Frank M. Scutch, III

(57) ABSTRACT

A user interface control software system (125) has software components organized into distinct partitions (210, 220, 230, 240) with a defined interface governing communications between components of different partitions. Preferably, the software components are organized into a core partition (210), a device specific partition (240), a feature enabler partition (220), and a signaling partition (230). The core partition (210) has software components that perform input handling, application interaction management, application control management, and output handling. The device specific partition (240) has software components for interfacing with user interface hardware in a manner specific to a particular type of communication device. The feature enabler partition (220) has software components that implement procedures for interacting with the user to perform a particular task. The signaling partition (230) manages procedures relating to a signaling protocol that requires user interaction. An interface protocol (350) governs inter-partition communications among software components of the various partitions.

10 Claims, 5 Drawing Sheets

USER INTERFACE CONTROL SOFTWARE FOR A COMMUNICATION DEVICE

TECHNICAL FIELD

This invention relates in general to communication devices, and more particularly, to the architecture of user interface software for a communication device.

BACKGROUND

Communication devices, such as portable radios, cellular telephones, pagers, and the like, offer sophisticated features, some requiring complex user interaction. Generally, a user interface for a communication device includes input devices, such as control knobs, buttons, and switches, and output devices such as a display, a speaker, annunciators, and so on. A user interacts with the communication device through the user interface to operate various device features. The user interface is also used to communicate status information regarding device operations. Ordinarily, the user interface operates under control of software executed by a microprocessor within the communication device. The software required to control the user interface, and to arbitrate priority for the various input and output devices to support multiple features, can be quite complex.

Prior art communication devices are known in which software is organized to execute within a microprocessor controlled radio operating environment to provide user interface control. One such example is described in U.S. Pat. No. 5,490,275, issued to Sandvos, et al. on Feb. 6, 1996, for a VIRTUAL RADIO INTERFACE AND RADIO OPERATING SYSTEM FOR A COMMUNICATION DEVICE, the entire contents of which are hereby incorporated by reference. Here, radio operating software is divided into a number of levels, including an ergonomics/control level 302, and a feature/protocol level 310. The ergonomics/control level 302 provide functionality for input and output devices of the user interface. The feature/protocol level 310 also provides for some control of the user interface, particularly for those features requiring interaction with the user. While this system implements various interfaces to aid in software portability, the resultant architecture may prove inadequate to meet the increasing demands for software portability in radio products.

It is desirable to provide for a software architecture that enables substantial portability and ease of maintenance for user interface software used in communication devices. Therefore, a new software architecture suitable for controlling the user interface of a communication device is needed.

DETAILED DESCRIPTION OF THE PREFERRED EMBODIMENT

The present invention provides for the management of user interface operations through software architected for adaptability across multiple hardware platforms and device configurations. The control software preferably operates on a communication device to manage all user interaction operations. In the preferred embodiment, the control software is architected to facilitate the addition, deletion, and testing of device features and signaling protocols requiring user interaction. The present invention provides for the separation of various components of the control software into distinct partitions with a defined interface governing communications between components of different partitions. Preferably, a set of executable software components are organized into a core partition, a device specific partition, a feature enabler partition, and a signaling partition. The core partition has software components that perform input handling, application interaction management, application control management, and output handling. The device specific partition has software components for interfacing with user interface hardware in a manner specific to a particular type of communication device. The feature enabler partition has software components that implement procedures for interacting with the user to perform a particular task, such as to implement a device feature. The signaling partition manages procedures relating to a signaling protocol that requires user interaction. An interface protocol governs inter-partition communications among software components of the core partition, the device specific partition, the feature enabler partition, and the signaling partition.

Figure 1:
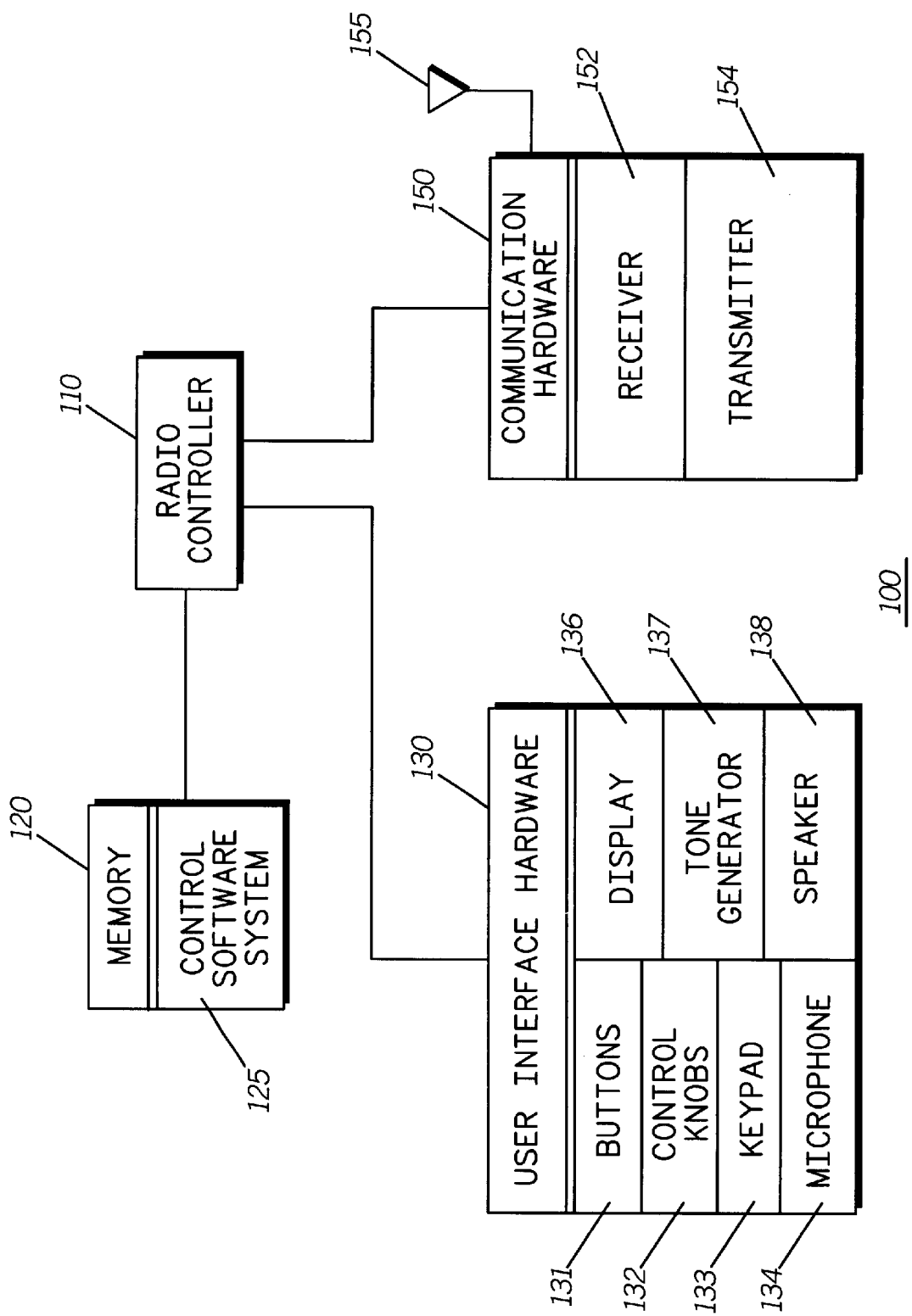
FIG. 1 is a block diagram of a radio communication device having user interface hardware and corresponding control software, in accordance with the present invention.

Referring now to FIG. 1, a simplified block diagram of a communication device 100 is shown, in accordance with the present invention. In the preferred embodiment, the communication device 100 is a two-way radio transceiver having circuitry for wireless communication over radio frequency channels. However, the present invention is equally applicable to other types of communication devices, such as cellular telephones, pagers, and the like. Principles of the present invention may also be applied to devices that are not related to communications. The radio 100 includes a radio controller 110, a memory 120, user interface hardware 130, and communication hardware 150. The user interface hardware 130 and communication hardware 150 operate under the control of the radio controller 110 using instructions stored in the memory 120. The radio controller 110 is of typical construction such as could be implemented with a microprocessor together with other control hardware components and a device operating system suitable for communication devices. Such arrangement is common in the art.

The communication hardware 150 includes a receiver 152 and a transmitter 154 that perform wireless operations through an antenna 155. The communication hardware 150 includes other elements (not shown) necessary for performing wireless radio communications as is known in the art. Additional details can be found in U.S. Pat. No. 5,490,275 previously referenced. The user interface hardware 130 has input and output devices. Input devices include buttons 131, control knobs 132, a keypad 133, and a microphone 134. Output devices include a display 136, a tone generator 137, and a speaker 138. According to the present invention, the user interface hardware 130 is managed by the radio controller 110 using a control software system 125 stored in the memory 120.

Figure 2:
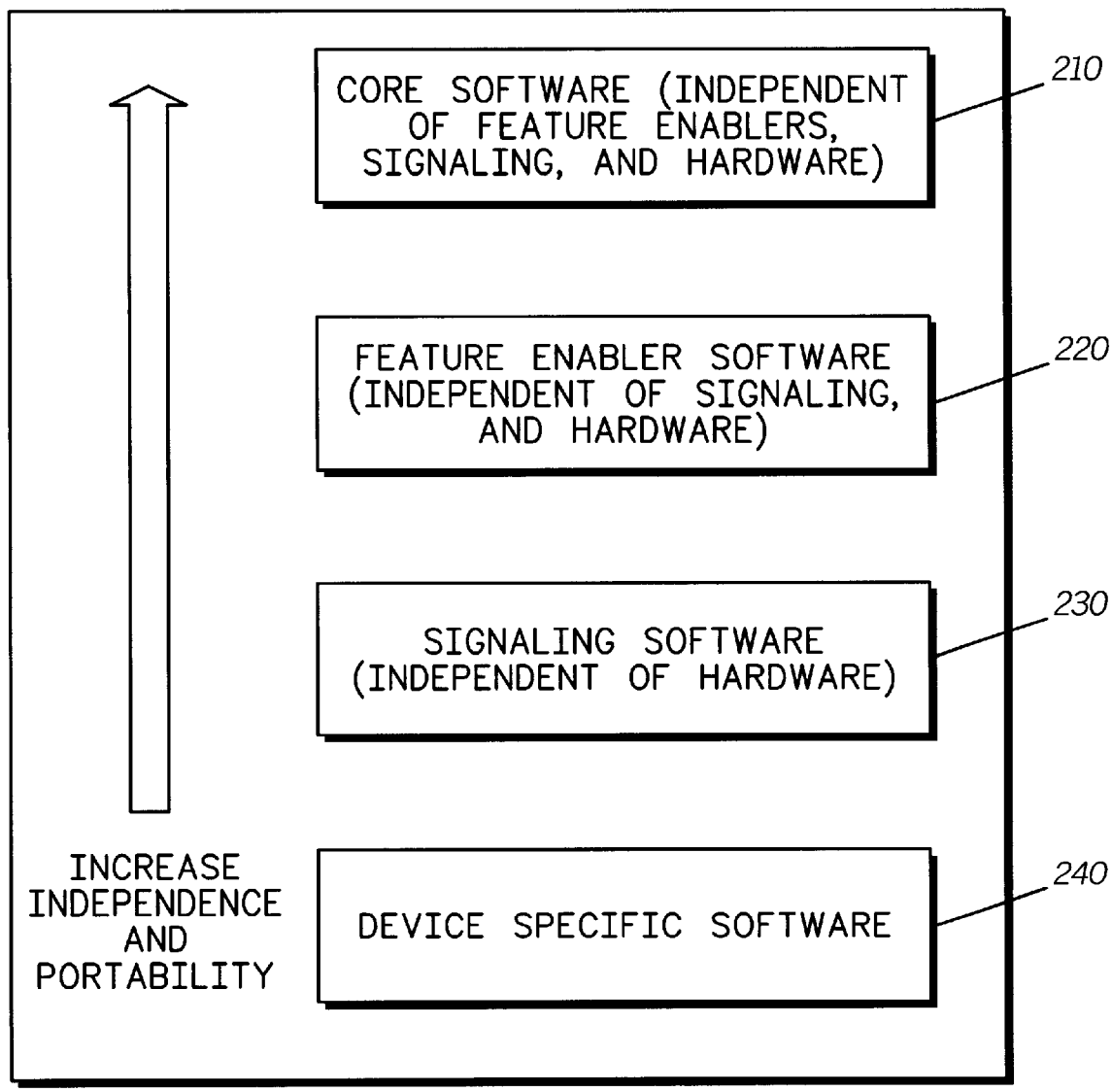
FIG. 2 is a block diagram showing the organization of the control software for the user interface, in accordance with the present invention.
Figure 3:
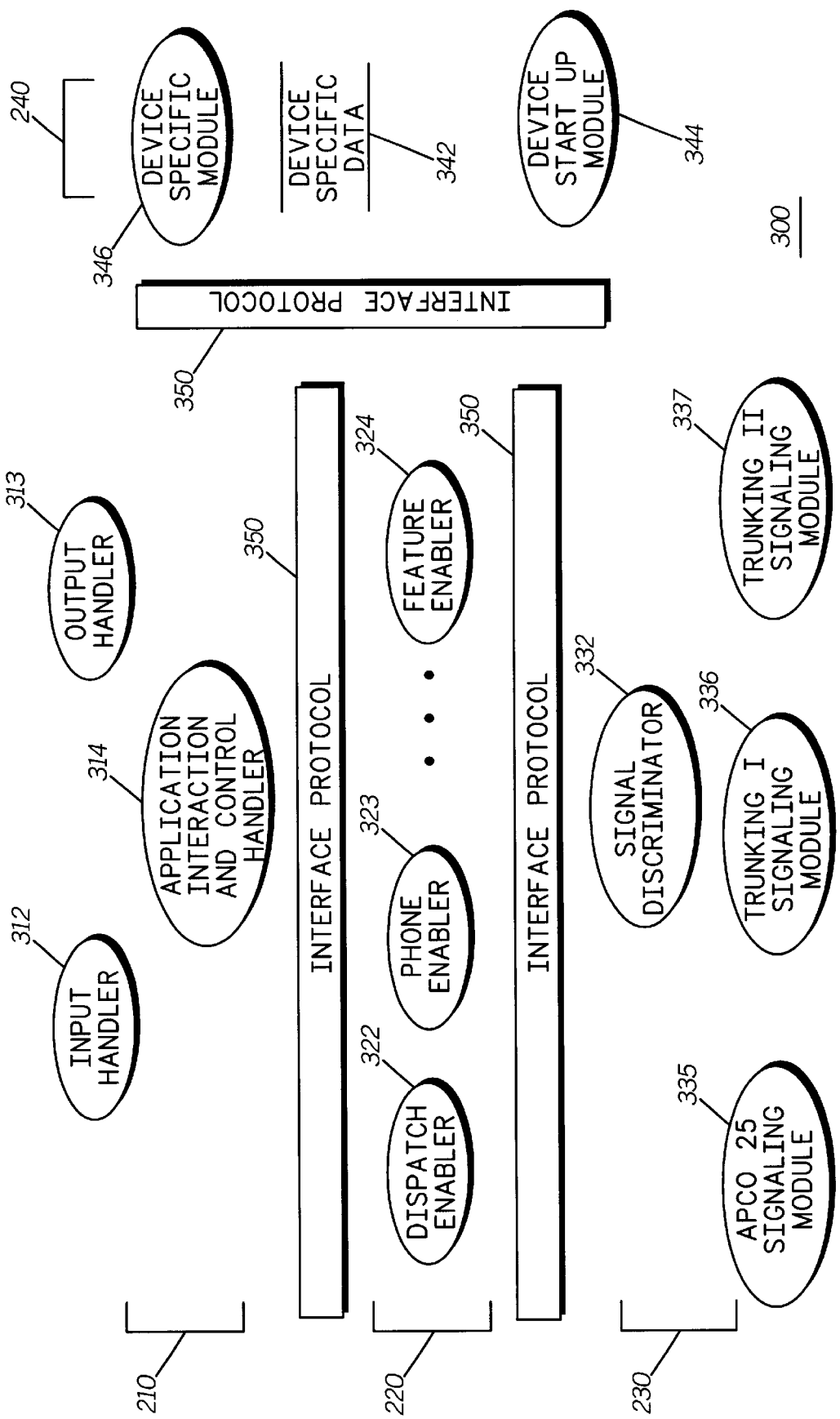
FIG. 3 is a block diagram highlighting the interface between various partitions of the control software system, in accordance with the present invention.

FIG. 2 is a block diagram showing the organization of software components of the user interface control software system 125, in accordance with the present invention. FIG. 3 is a block diagram highlighting significant individual software components of the various partitions of the user interface control software, in one embodiment of the present invention. Referring to FIGS. 2 and 3, software components of the user interface control software are segregated based at least in part on portability and adaptability considerations. It is anticipated that the software configuration will support different feature sets, different signaling schemes, and different user interface hardware. Thus, the software components of the user interface control software are distributed into one of the following: a core software partition 210, a feature enabler partition 220, a signaling partition 230, and a device specific partition 240. Hardware dependency decreases for software components in the device specific partition 240, the signaling partition 230, the feature enabler partition 220, and the core partition 210, in that order. As a result, portability of the user interface control software is significantly enhanced. For example, support for new signaling schemes can be added without regard to the specifics of the hardware platform. Similarly, new feature enablers can be added without regard to signaling schemes used by the communication device or the underlying hardware platform. Software components of the core partition 210 are essentially abstracted from the user interface and communication hardware. When a new hardware platform is to be supported, the specifics of that particular hardware platform are accommodated in the device specific partition 240.

The device specific partition 240 has executable and non-executable software components that provide services for interfacing with the user interface hardware in a manner specific to a hardware platform, or specific to a particular device configuration. The device specific software components 240 provide their services to the software components of the signaling partition 230, the feature enabling partition 220, and the core partition 210, so that differences in hardware platform and device configuration can be easily managed. Differences may relate to the availability and characteristics of input and output devices. For example, a display may have more display lines in one supported hardware platform and less in another. It is anticipated that software components residing in the device specific partition 240 may undergo substantial changes to support different hardware platforms. In the preferred embodiment, a data store 342, such as a table, provides information on device specific characteristics; a device start up module 344 provides information on feature enablers to be launched during device initialization; and, a device specific module 346 provides information on device characteristics. An interface protocol 350 defines communication between software components of the signaling partition 230, the feature enabler partition 220, and the core partition 210, and the software components device specific partition 240. In the preferred embodiment, the interface between software components of other partition and the software components of the device specific partition is made using predefined function calls.

The feature enabler software partition 220 contains executable software components (also referred to herein as applications) that govern procedures for interfacing with a user to perform a particular task. A procedure may involve a sequence of input and output operations required for a particular device feature. The feature enabler software components 220 support user interface features that are not specific to a signaling scheme, or a specific hardware platform. Accordingly, the software components 220 are signaling protocol independent, and hardware platform independent. In the preferred embodiment, the feature enabler partition contains a dispatch enabler 322, and a phone enabler 323, and various other feature enablers 324 that provide support for managing incoming data, for responding to keypad entries requiring display, and for setting up procedures for various communication modes, among other features. The software components of the feature enabler partition depend on the software components of the core software partition 210 to provide all feature interaction management and feature control services. The feature enabler software components 220 interact with the software components of the core software partition 210 through the predefined interface protocol 350.

The signaling partition 230 contain executable software components that manage user interaction procedures relating to a particular signaling protocol, such as for wireless communications with another communication device. Preferably, the signaling partition includes software components 335, 336, 337 that implement a set of signaling protocols or types, and a signal discriminating module 332 that selects from among the signaling protocols. A software component for a particular signaling protocol has knowledge of the behaviors and operations of a particular signaling scheme as applied to various applications within the feature enabler partition. The signaling discriminator 332 is preferably a table driven module that translates primitives received from feature enabler software 220 to function calls for corresponding signaling related software functions. The signaling discriminator 332 acts as a selector for the proper signaling specific software to fulfill the particular need of a feature enabler software component 220 initiating the call. Preferably, the signal discriminator 332 has knowledge of the set of supported features. In the example shown, the supported features include the Association of Public safety Communication Official (APCO) standard protocol APCO 25, and Trunking I and Trunking II, which are signaling protocols known in the art. These signaling protocols are implemented in various signaling modules 335, 336, 337.

The software components of the signaling partition relate to user interaction aspects pertaining to a signaling protocol, rather than, for example, low level functions relating to over-the-air interface protocols. One example of user interaction specifics relating to signaling is the number of digits in an identifier for a particular signaling scheme. Another example involve signaling specific display formats. An out-of-range display may be applicable when operating in a trunked system mode, but not applicable when operating in a conventional system mode. The software components of the signaling partition 230 interface with software components of the feature enabler partition 220, and with software components of the device specific partition 240 to perform all signaling related user interaction services required by the feature enabler partition 220, or required in support of a particular signaling protocol. Thus, the software components of the signaling partition 230 operate based upon instructions received from software components of the feature enabler partition 220.

The core software partition 210 contains executable software components that provide resource management services for communication device operations that interact with the user. The core software components 210 are hardware platform or device configuration, signaling, and feature independent. The core software components 210 include an input handler 312, an feature interaction and control handler 314, and an output handler 313. The input handler 312 cooperates with the feature interaction and control handler 314 to provide generic input handling services, such as control of user input and input overflow; translation of physical inputs to logical inputs; and routing inputs required by software components of other partitions appropriately. The feature interaction and control handler 314 operates to provide resource allocation, management, and control services for the various components of other partitions. Accordingly, the feature interaction and control handler 314 allocates and deallocates resources for a feature enabler software component; manage communications between feature software components; manage the launching of feature enablers; and manage interaction between feature enablers. The output handler 313 provide support for the various means of communicating information to a user as may be needed for feature enablement. The output handler 313 provides output services for the user interface control software system, and interfaces with software components of the device specific partition 240 as needed to communicate with a particular output device. The core software preferably consists of discrete executables, or binary files that may be linked with other software components to form the user interface control software system. As the core software is hardware platform or device configuration, signaling, and feature independent, only software components that are usable, without modification on all applicable device platforms are included. In general, the core software 210 interfaces with an operating system to perform its various functions.

The interface protocol 350 governs inter-partition communications among the core partition 210, the feature enabler partition 220, and the signaling partition 230, and between these partitions 210, 220, 230 and the device specific partition 240. The interface protocol 350 permits direct communication between software components of other partitions and the device specific partition. Direct communication is also permitted between software components of the core partition 210 and software components of the feature enabler partition 220, and between software components of the feature enabler partition 220 and software components of the signaling partition 230. However, in the preferred embodiment, there is no direct interface between software components of the core partition 210 and software components of the signaling partition 230. The interface protocol 350 comprises function calls and messages each having a set of parameters and particular format that specify information content. The interface protocol 350 also specifies rules governing permissible communications among the various partitions. The software components have independent operation with respect to each other except for calls made according to the interface protocol.

Figure 4:
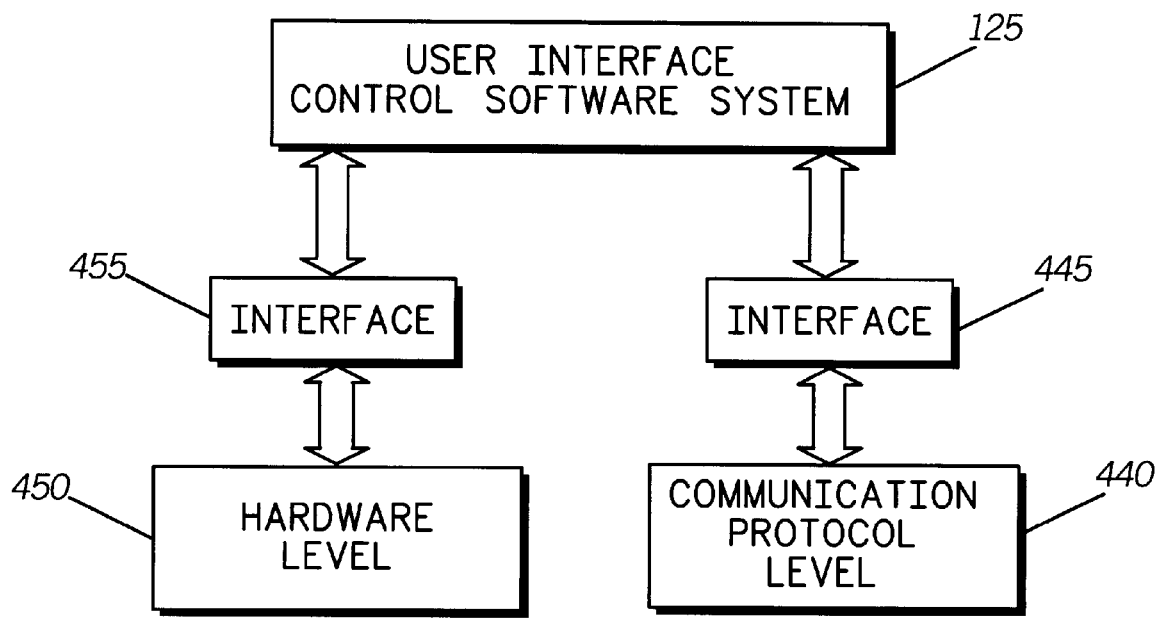
FIG. 4 is a block diagram of communication device software, that includes the user interface control software system, according to one embodiment of the present invention.

FIG. 4 is a block diagram of communication device software 400, that includes the user interface control software system 125, according to one embodiment of the present invention. The user interface control software system 125 interacts with hardware level software components 450 through an interface 455, for functions such as accessing internal and external physical devices. For example, a key or button scan is performed by hardware level software and the results provided via the interface 455. The user interface control software system 125 interacts with communication protocol level software components 440 through another interface 445 to perform link level signal protocol functions. For example, signal encoding and decoding, and other over-the-air interface protocol requirements are performed by communication protocol level software 440. An example of such organization as described for the communication protocol level and hardware level software groupings 440, 450 can be found in U.S. Pat. No. 5,490,275 previously referenced, with particular reference to the descriptions regarding the common level, and low level software groupings, respectively.

Figure 5:
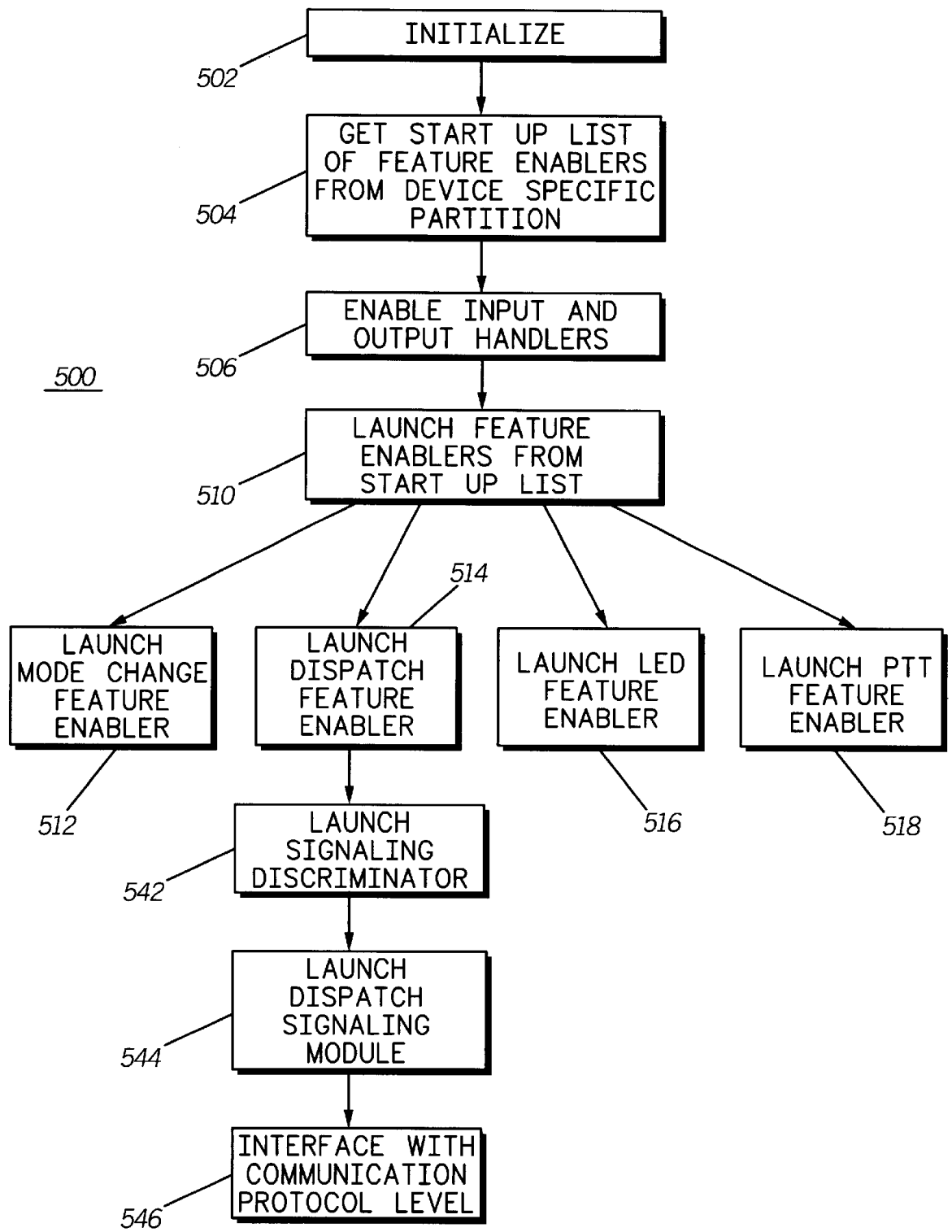
FIG. 5 is a block diagram of procedures for one embodiment of the control software system, in which software components of the various partitions are launched to enable specific operating characteristics of a communication device, in accordance with the present invention.

FIG. 5 is a block diagram of procedures 500 for operating the user interface control software system, according to one embodiment of the present invention. In summary, the software components of the core partition operate to perform operational and control services for the software components of the feature enabler partition. In so doing, the core software launches software components of the feature enabler partition, and provide resource management services to those software components. A feature enabler software component may communicate with components in the core partition, components in the device specific partition, and components in the signaling partition, and may initiate the launch of software components in the various partitions.

Upon startup, the application interaction and control handler of the core software initializes then interfaces with a particular software component of the device specific partition to obtain initialization information, steps 502, 504. In the preferred embodiment, the software component of the device specific partition loads a queue with a list of feature enablers to launch. The input and output handlers are enabled to receive and process input and output requests, steps 506. The application interaction and control handler then launches each feature enabler specified in turn 510, 512, 514, 516, 518. In the example shown, the application interaction and control handler launches a mode change enabler that sets the initial display mode, step 512; a dispatch enabler that enables dispatch signaling, step 514; a light emitting diode display enabler for annunciator operation, step 516; and a push-to-talk (PTT) button enabler, step 518. The application interaction and control handler then responds to requests for service from any of the executing feature enablers. This may include requests to launch other feature enablers.

A feature enabler may interface with the signaling partition to select a particular signaling module via the signaling discriminator. For example, the dispatch feature enabler launches the signaling discriminator, via a function call, step 542 and the signaling discriminator selects and launches an appropriate dispatch signaling module using another function call, step 544. The dispatch signaling module interfaces with the communication protocol level for over-the-air communication services, step 546. The feature enablers utilize the services provided by the input and output handlers to interact with the user when necessary.

The present invention provides significant advantages. By architecting user interface control software as described, portability and ease of maintenance are enhanced resulting in substantial cost savings. Moreover, software stability and quality is increased as software components can be tested and reused with confidence.

What is claimed is:

1. In a communication device having user interface hardware for interacting with a user, a user interface control software system comprising:
   a set of executable software elements organized into:
     a core partition having a first set of software components that provide resource management services for communication device operations that interact with the user, which first set of software components are abstracted from the user interface hardware and further to perform input handling, application interaction management, application control management, and output handling of the user interface hardware;

a device specific partition having a second set of software components that provide services for interfacing with the user interface hardware;

a feature enabler partition having a third set of software components that govern procedures for interfacing with the user to perform a particular task;

a signaling partition having a fourth set of software components that manage signaling procedures for wireless radio communications that require user interaction; and an interface protocol for governing all communications among the core partition, the device specific partition, the feature enabler partition, and the signaling partition such that there is no direct interface between the core partition and the signaling partition.

2. The user interface control software system of claim 1, wherein the feature enabler partition comprises software components that implement a sequence of input and output operations according to a particular communication device feature.

3. The user interface control software system of claim 2, wherein the feature enabler partition comprises software components that implement telephone interconnect procedures.

4. The user interface control software system of claim 1, wherein the signaling partition comprises software components that implement a plurality of signaling types, and a signal discriminating module that selects from among the plurality of signaling types.

5. The control software system of claim 1, wherein:

the set of executable software components of the core partition operates independently of the software components of the device specific partition, the feature enabler partition, and the signaling partition;

the set of executable software components of the feature enabler partition operates independently of the software components of the device specific partition, and the signaling partition; and the set of executable software components of the signaling partition operates independently of the software components of the device specific partition.

6. A communication device having an interface for interacting with a user, the communication device comprising:

user interface hardware;

communication hardware;

a memory having a user interface control software system;

a controller coupled to the memory, to the user interface hardware, and to the communication hardware, the controller providing operational control of the user interface hardware using the user interface control software system;

wherein the user interface control software system comprises:

a plurality of executable software components organized into a plurality of software partitions comprising a core partition, a device specific partition, a feature enabler partition, and a signaling partition;

the core partition having software components that perform input handling, application interaction management, application control management, and output handling;

the device specific partition having software components that provide services for interfacing with the user interface hardware;

the feature enabler partition having software components that implement procedures for interfacing with the user to perform a particular task;

the signaling partition comprising software components that implement a plurality of signaling types, and a signal discriminating module that selects from among the plurality of signaling types; and wherein the plurality of executable software components incorporates an interface protocol that govern all communication between any two of the plurality of software partitions such that the plurality of software partitions have independent operation with respect to each other except for calls made according to the interface protocol.

7. The communication device of claim 6, wherein the signaling partition has software components that manage protocol procedures for wireless radio communications with another communication device.

8. In a communication device having user interface hardware for interacting with a user, a method comprising:

operating a first set of software components that manage signaling procedures that require a user interface;

operating a second set of software components that implement procedures that interact with the user through the user interface hardware, which second set of software components utilize services of the first set of software components;

operating a third set of software components that perform interaction and control management for the second set of software components, and which provide services to the second set of software components;

operating the first, second, and third sets of software components, in first, second, and third logically separated software partitions, respectively, as part of a user interface software system, which components of the first, second, and third logically separated software partitions interface with each other only through an interface protocol that governs all communication therebetween;

operating a fourth set of software components in a fourth logically separated software partition, which fourth set of software components provide device specific services to the first, second, and third sets of software components; and operating the first, second, third, and fourth sets of software components only through the interface protocol.

9. The method of claim 8, further comprising the steps of:

performing all input and output handling services for the second set of software components through the third set of software components.

10. The method of claim 8, wherein the step of operating a first set of software components comprises the steps of:

operating a plurality of signaling procedures; and selecting from among the plurality of signaling procedures upon instruction received from one of the third set of software components.

* * * * *